Feb. 23, 1943.                C. D. LOWRY                 2,312,179
                    COMBINATION CORNER AND REVERSE BAR
                    Filed March 30, 1940        2 Sheets-Sheet 1

Inventor
CLYDE D. LOWRY.
By Frank Fraser
Attorney

Feb. 23, 1943. C. D. LOWRY 2,312,179
COMBINATION CORNER AND REVERSE BAR
Filed March 30, 1940 2 Sheets-Sheet 2

Inventor
CLYDE D. LOWRY.
By Frank Fraser
Attorney

Patented Feb. 23, 1943

2,312,179

UNITED STATES PATENT OFFICE 2,312,179

COMBINATION CORNER AND REVERSE BAR

Clyde D. Lowry, Toledo, Ohio, assignor to Libbey-Owens-Ford Glass Company, Toledo, Ohio, a corporation of Ohio Application March 30, 1940, Serial No. 327,039

2 Claims. (Cl. 189—78)

The present invention relates to vertical bars adapted for joining the adjacent edges of two sheets of glass in store and window fronts.

In the installation of store and window fronts, it is quite common to mount two sheets of glass at an angle to one another to form a corner. When the glass sheets extend outwardly and rearwardly toward the back of the window or store front they form what is usually termed a salient corner. On the other hand, when the glass sheets extend forwardly and outwardly they form what is commonly referred to as a reverse corner.

An object of this invention is to provide a combination corner and reverse bar for joining the adjacent edges of the two sheets of glass whether they are arranged to form a salient corner or a reverse corner.

Another object of the invention is to provide such a bar including two sections positioned at the front and rear of the glass sheets and means for securing said sections together to firmly clamp the sheets therebetween; said sections being interchangeable with one another so that each may constitute either the front section or the rear section depending upon whether the bar is to be used as a corner bar or a reverse bar.

A further object of the invention is the provision of such a bar embodying a reinforcing member secured to the rear section thereof, each of said sections of the bar having flat surface portions upon the outer face thereof adapted for engagement by said reinforcing member when the respective section is used as the rear section.

Other objects and advantages of the invention will become more apparent during the course of the following description, when taken in connection with the accompanying drawings.

In the drawings, wherein like numerals are employed to designate like parts throughout the same:

Figure 1:
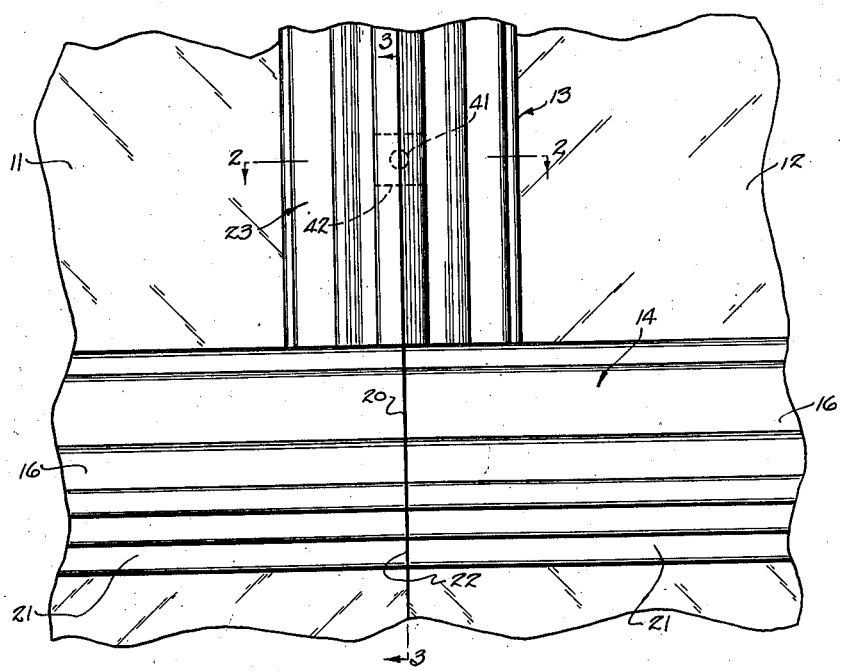
Fig. 1 is a front view of a vertical bar constructed in accordance with the invention and shown in association with a metal sash construction.
Figure 2:
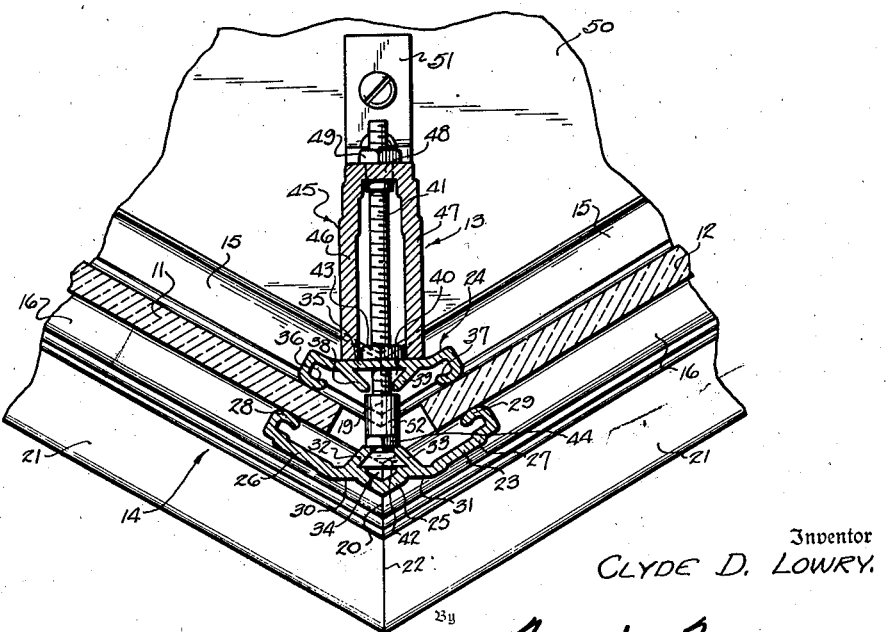
Fig. 2 is a horizontal section taken substantially on line 2—2 of Fig. 1 showing the bar used as a corner bar.
Figure 3:
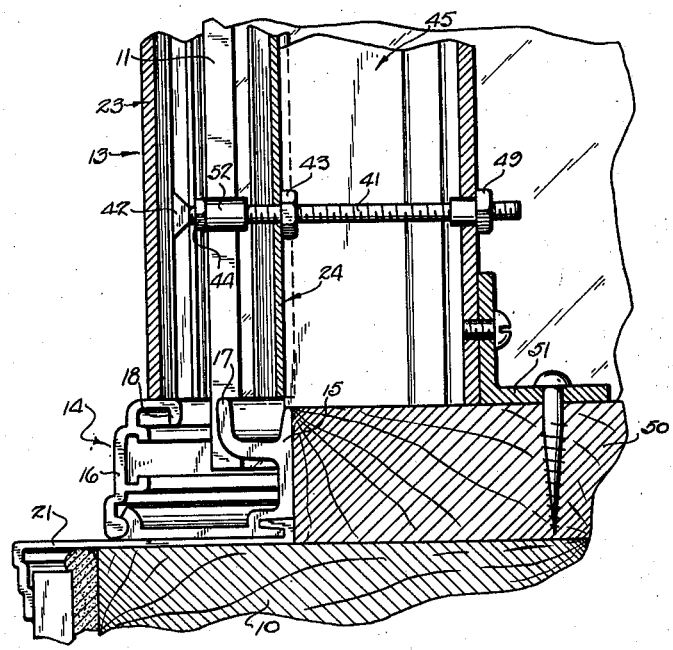
Fig. 3 is a vertical section taken substantially on line 3—3 of Fig. 1.
Figure 4:
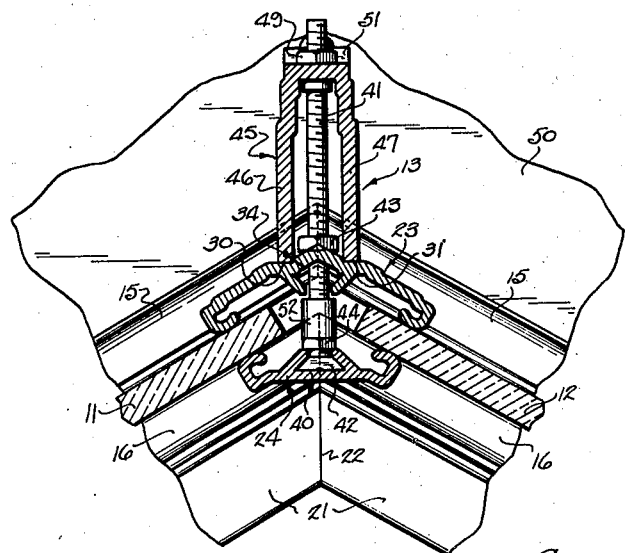
Fig. 4 is a horizontal transverse section showing the bar used as a reverse bar.

Referring now to the drawings, the numeral 10 designates a horizontal wooden sill of the usual framing in which are mounted two sheets of glass 11 and 12; said sheets being arranged at an angle to one another to form a corner. In Fig. 2, the glass sheets extend outwardly and rearwardly toward the back of the window or store front to form a salient corner, while, in Fig. 4, the sheets of glass extend forwardly and outwardly to form a reverse corner. The adjacent vertical edges of the glass sheets are spaced from one another and are connected together by the combination corner and reverse bar provided by the present invention and designated in its entirety by the numeral 13. The glass sheets 11 and 12 are shown as being secured at their lower ends by the metal sash construction 14 mounted upon the wooden sill 10. Similar metal sash constructions may also be provided to engage the upper edges of the glass sheets and the side edges thereof and which sash constructions would be carried by the head and side jambs of the framing in a manner well known in the art.

Although the present invention is not restricted to the use of any particular type of metal sash construction for the glass sheets 11 and 12, the sash construction 14 may consist generally of a stationary section 15 lying in back of each sheet of glass and a movable section 16 arranged to the front of each sheet, said back and front sections being provided at their inner ends with oppositely disposed lips 17 and 18 respectively which engage the opposite faces of the glass sheets and serve to clamp said sheets in place. The means for securing the front and rear sash sections together has not been illustrated as it constitutes no part of the present invention per se, and any suitable means may be provided for this purpose. The adjacent ends of the rear sections 15 are preferably mitered as at 19 and abut one another, while the adjacent ends of the front sections 16 are mitered as at 20. Instead of resting directly upon the wooden sill 10, the metal sash construction 14 can be supported upon metal sill plates 21 carried by said sill and having their adjacent ends mitered as at 22.

The combination corner and reverse bar 13 comprises the two members or sections 23 and 24 disposed at opposite sides of the glass sheets 11 and 12 and adapted to clamp said sheets therebetween. The sections 23 and 24 are interchangeable with one another in that each section may constitute either the front section or the rear section of the bar depending upon whether the bar is to be used as a corner bar or a reverse bar. Thus, when the bar is used as a corner bar as in Fig. 2 the section 23 constitutes the front section and the section 24 the rear section, whereas when the bar is used as a reverse bar as in Fig. 2 the section 23 constitutes the rear section and the section 24 the front section. In other words, one section constitutes the front section when the bar is used as a corner bar and the rear section when said bar is used as a reverse bar, while the other section constitutes the rear section when the bar is used as a corner bar and the front section when said bar is used as a reverse bar.

The section 23 comprises a central rib or bead 25 from the opposite sides of which extend the two wing portions 26 and 27 provided along their outer edges with the inturned glass contacting flanges 28 and 29 respectively which engage the respective faces of the glass sheets 11 and 12. The outer face of the section 23 is provided at opposite sides of the central bead or rib 25 with relatively narrow flat surface portions 30 and 31, the purpose of which will be more clearly hereinafter apparent. Formed upon the inner face of the section 23 are converging flanges 32 and 33 which provide therebetween a longitudinally extending undercut channel 34.

The section 24 comprises a substantially flat body portion 35 provided along its opposite side edges with the inturned glass contacting flanges 36 and 37 adapted to engage the adjacent faces of the glass sheets 11 and 12. Formed upon the inner face of the body portion 35 of section 24 are the flanges 38 and 39 which define therebetween a channel 40.

The tensioning means for connecting the sections 23 and 24 together includes a plurality of horizontal bolts 41; each bolt being provided at its forward end with a head 42 received in the channel of the section constituting the front section. Thus, as shown in Fig. 2, the heads 42 of the bolts 41 are received in the channel 34 of section 23 and project rearwardly through openings in section 24, whereas in Fig. 4 the heads of the bolts are received within the channel 40 of section 24 and project rearwardly through openings in section 23. Threaded upon the bolts 41 rearwardly of the rear section are nuts 43 and upon tightening of these nuts the two sections can be drawn together to clamp the glass sheets between the flanges 28—36 and 29—37 of said sections. In order to facilitate assembly of the two sections 23 and 24, the fastening bolts 41 may be secured at the desired locations along the front section by nuts 44.

The numeral 45 designates a reinforcing channel member comprising the spaced parallel legs 46 and 47 and the integral base portion 48. The reinforcing member is also adapted to be secured in place by the fastening bolts 41 which pass through the base portion 48 thereof and have threaded thereupon nuts 49. If desired, the reinforcing member 45 can also be secured at its lower end to a wooden back-stop 50 carried by sill 10 by angle brackets 51 and also similarly secured at its upper end if preferred.

When the bar 13 is used as a corner bar (Fig. 2) and the section 24 constitutes the rear section, the free ends of the legs 46 and 47 of reinforcing member 45 engage the substantially flat body portion 35 of said section. On the other hand, when the bar is used as a reverse bar (Fig. 4) and the section 23 constitutes the rear section, the legs of the reinforcing member bear against the flat surface portions 30 and 31 of said section. It will thus be seen that the sections 23 and 24 of the bar are interchangeable so that either section may constitute the front section or the rear section. Further, that the reinforcing member 45 can be readily associated with either section. It will be noted that the section 24 is arranged inside the angle of the two sheets of glass 11 and 12 when the bar is used both as a corner bar and a reverse bar, while the section 23 is arranged outside the angle of the glass sheets when the bar is used as a corner bar or a reverse bar. The only preparation required for installation is that after it has been decided whether the bar is to be used as a corner bar or a reverse bar, the necessary openings for the fastening bolts 41 be drilled in the section which will constitute the rear section.

It is preferred that the sections 23 and 24 and also the reinforcing member 45 be of relatively heavy, rigid construction and to this end may consist of extruded aluminum, bronze, or other metal. The inturned glass contacting flanges 28 and 29 of section 23 and also the corresponding flanges 36 and 37 of section 24 are preferably provided with smooth, rounded surfaces engaging the glass sheets so that the sheets can be swung inwardly or outwardly to a limited extent to vary the angle therebetween.

In order to prevent the adjacent vertical edges of the glass sheets 11 and 12 from engaging the metal clamping bolts 41 either during or after installation, there is preferably carried by each of said bolts a relatively short tubular sleeve 52 of suitable resilient material such as rubber, rubber composition, or the like.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A combination corner and reverse bar for joining the adjacent edges of two sheets of glass arranged at an angle to one another to form a corner in store or window fronts, comprising two rigid metal sections positioned at the front and rear of the glass sheets and each having flat surface portions upon its outer face; a channel upon its inner face and glass engaging wing portions at opposite sides of said channel, fastening means including bolts having heads received within the channel of the front section and passing through openings in the rear section for securing said sections together to clamp said sheets therebetween, one of said sections forming the front section when the bar is used as a corner bar and the rear section without deformation of the wing portions thereof when said bar is used as a reverse bar, while the other section constitutes the rear section when the bar is used as a corner bar and the front section without deformation of the wing portions thereof when said bar is used as a reverse bar, and a reinforcing channel member secured to the rear section by said bolts and having portions bearing against the flat surface portions of said rear section.

2. A combination corner and reverse bar for joining the adjacent edges of two sheets of glass arranged at an angle to one another to form a corner in store or window fronts, comprising two rigid metal sections positioned at the front and rear of the glass sheets and each having flat surface portions upon its outer face and a channel upon its inner face, fastening means including bolts having heads received within the channel of the front section and passing through openings in the rear section for securing said sections together to clamp said sheets therebetween, one of said sections being disposed inside the angle of the sheets when the bar is used either as a corner bar or a reverse bar, while the other section is disposed outside the angle of said sheets when the bar is used either as a corner bar or a reverse bar, and a reinforcing channel member secured to the rear section by said bolts and having portions bearing against the flat surface portions of said rear section.

CLYDE D. LOWRY.